(12) United States Patent
Kim et al.

(10) Patent No.: US 11,964,392 B2
(45) Date of Patent: Apr. 23, 2024

(54) METHOD AND SYSTEM FOR SPECIFYING NODES FOR ROBOT PATH PLANNING

(71) Applicant: NAVER LABS CORPORATION, Seongnam-si (KR)

(72) Inventors: Seoktae Kim, Seongnam-si (KR); Kahyeon Kim, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 102 days.

(21) Appl. No.: 17/370,351

(22) Filed: Jul. 8, 2021

(65) Prior Publication Data

US 2022/0009099 A1  Jan. 13, 2022

(30) Foreign Application Priority Data

Jul. 8, 2020 (KR) .................... 10-2020-0083935

(51) Int. Cl.
*B25J 9/16* (2006.01)
*G01C 21/20* (2006.01)
*G05D 1/00* (2006.01)

(52) U.S. Cl.
CPC .......... *B25J 9/1664* (2013.01); *G01C 21/206* (2013.01); *G05D 1/0223* (2013.01); *G05D 1/024* (2013.01); *G05D 1/0274* (2013.01)

(58) Field of Classification Search
CPC ... B25J 9/1664; G01C 21/206; G05D 1/0223; G05D 1/024; G05D 1/0274; G05D 2201/0211; G05D 1/0217
See application file for complete search history.

(56) References Cited

U.S. PATENT DOCUMENTS

| | | | |
|---|---|---|---|
| 2008/0009964 A1* | 1/2008 | Bruemmer | G05D 1/0223 700/245 |
| 2011/0082638 A1* | 4/2011 | Khorashadi | G01C 21/206 701/532 |
| 2017/0089709 A1* | 3/2017 | Marusco | G01C 21/206 |
| 2018/0321675 A1 | 11/2018 | Russell et al. | |
| 2019/0161274 A1* | 5/2019 | Paschall, II | G05D 1/0246 |
| 2020/0009736 A1 | 1/2020 | Pinter et al. | |
| 2020/0053325 A1* | 2/2020 | Deyle | G05D 1/0088 |
| 2020/0125597 A1* | 4/2020 | Eoh | G05D 1/0246 |
| 2020/0156256 A1 | 5/2020 | Park et al. | |
| 2020/0174480 A1 | 6/2020 | Trautman et al. | |

(Continued)

FOREIGN PATENT DOCUMENTS

| | | |
|---|---|---|
| JP | 11249738 A | 9/1999 |
| JP | 2004046465 A | 2/2004 |
| JP | 2017220121 A | 12/2017 |

(Continued)

OTHER PUBLICATIONS

Korean Office Action issued in corresponding Korean patent application No. 10-2020-083935, dated Jun. 28, 2021.

(Continued)

*Primary Examiner* — Jason Holloway
*Assistant Examiner* — Blake A Wood
(74) *Attorney, Agent, or Firm* — Greer Burns & Crain Ltd.

(57) ABSTRACT

A method and a system generate global path planning of a robot according to a node specification principle that is defined based on social norms for an indoor space using an indoor map to assist human-friendly navigation of the robot.

18 Claims, 13 Drawing Sheets

(56) References Cited

U.S. PATENT DOCUMENTS

2021/0191422 A1* 6/2021 Knuth, Jr. ............. G05D 1/0274
2022/0057803 A1* 2/2022 Sorin ................... G05D 1/0088

FOREIGN PATENT DOCUMENTS

| JP | 2018010403 A | 1/2018 |
|---|---|---|
| KR | 1020050024840 A | 3/2005 |
| KR | 101660162 B1 | 10/2016 |
| KR | 1020190003124 A | 1/2019 |
| WO | 2020049664 A1 | 3/2020 |
| WO | 2020061250 A1 | 3/2020 |
| WO | 2019171916 A1 | 8/2020 |

OTHER PUBLICATIONS

European search report issued in corresponding European patent application No. 21184328.9, dated Oct. 21, 2021.
European Office Action issued in corresponding European patent application No. 21184328.9, dated Jul. 21, 2022.
Office Action issued in corresponding Japanese patent application No. 2021-110135, dated Aug. 30, 2022.

* cited by examiner

<Robot control system>

| Indoor space(10) ||
|---|---|
| Standard Space(510) | Room |
| Connecting Space(520) | Door(521) |
| | Corridor(522) |
| | Junction(523) |
| | Left-well(524) |
| Composite Space(530) | Hall |

701 — Door (D)
702 — Corridor (C)
703 — Junction (J)
704 — Robot Lane (R)
705 — Left-well (L)
706 — Room (R)

METHOD AND SYSTEM FOR SPECIFYING NODES FOR ROBOT PATH PLANNING

CROSS-REFERENCE TO RELATED APPLICATION

This U.S. non-provisional application claims the benefit of priority under 35 U.S.C. § 119 to Korean Patent Application No. 10-2020-0083935 filed on Jul. 8, 2020, in the Korean Intellectual Property Office (KIPO), the entire contents of which are incorporated herein by reference.

BACKGROUND OF THE INVENTION

Field of Invention

One or more example embodiments of the following description relate to technology for global path planning of a robot.

Description of Related Art

An autonomous driving robot refers to a robot that searches around the surroundings, senses obstacles, and finds an optimal path to a destination using wheels or legs, and is developed and used in various fields, such as, for example, in autonomous driving vehicles, logistics, hotel services, and robot vacuum cleaners.

In an environment in which a robot operates among people, the robot needs to move in a friendly and efficient manner. To be human-friendly, the robot may need to be non-threatening and predictable and follow social norms.

For efficient movement of the robot, it is necessary to plan an optimal path indoors and to interact with indoor infrastructure, such as an elevator.

Korean Patent Laid-Open Publication No. 10-2005-0024840 describes technology related to a path planning method for an autonomous mobile robot, and also describes a method of planning an optimal path through which a mobile robot autonomously moving in a home or an office may move safely and quickly to a target point while avoiding obstacles.

The aforementioned information is simply provided to help in understanding the background of the invention, may not include contents that do not form a part of the related art, and may not include what the related art may present to those skilled in the art.

BRIEF SUMMARY OF THE INVENTION

One or more example embodiments provide a method and system that may define a node specification principle for global path planning of a robot.

One or more example embodiments also provide a method and system that may assist human-friendly navigation of a robot in an indoor environment based on social norms as well as an efficient movement of the robot.

According to an aspect of at least one example embodiment, there is provided a path planning method performed by a computer system including at least one processor configured to execute computer-readable instructions included in a memory, the path planning method including, by the at least one processor, generating global path planning of a robot for an indoor space based on an indoor map. The generating includes generating the global path planning according to a node specification principle that is defined based on social norms for the indoor space.

The generating of the global path planning of the robot may include generating the global path planning using nodes and edges that are specified based on a right-hand traffic (RHT)-based principle.

An attribute including position coordinates and a travel direction may be defined for each of the nodes, and an attribute including a travel speed may be defined for each of the edges.

The node specification principle may include a specification principle for a corridor entry node that represents a right corridor start point in a corridor and a corridor end node that represents a right corridor end point in the corridor.

The node specification principle may further include a specification principle for at least one of a door area start node that represents a start point of a caution section in front of a door, a door area end node that represents an end point of the caution section in front of the door, a door pass node that represents a point passing the door, a door open prevention node that represents a point for avoiding opening of the door, a robot lane node that represents a point on a robot lane, a basic passing node that represents a point requiring specification of a separate node, and a waiting node that represents a waiting position.

The node specification principle may include an edge specification principle for specifying an edge that connects nodes as a travel path of the robot.

The edge specification principle may include a specification principle for a basic edge in which the robot travels at a basic speed of the robot, a caution edge in which the robot travels at a reduced speed of a preset percentage of the basic speed or less, and a speedy edge in which the robot travels at a high speed of a preset percentage of the basic speed or more.

The edge specification principle may be configured to specify a caution edge in which the robot travels at a reduced speed of a preset percentage of a basic speed of the robot or less in the case of at least one of a junction, a front of the door, and an elevator, and to specify a speedy edge in which the robot travels at a high speed of the preset percentage of the basic speed or more in the case of a robot lane.

The generating of the global path planning of the robot may include generating all the vertices of an offset side based on an offset value preset for the indoor space, as nodes for movement of the robot.

The generating of the global path planning of the robot may include determining a reference point based on a travel direction of the robot and generating, as a node for movement of the robot, a point offset by a preset offset value from the reference point.

According to an aspect of at least one example embodiment, there is provided a non-transitory computer-readable recording medium storing instructions that, when executed by a processor, cause the processor to perform the steps of the path planning method.

According to an aspect of at least one example embodiment, there is provided a computer system including at least one processor configured to execute computer-readable instructions included in a memory. The at least one processor is configured to generate global path planning of a robot for an indoor space based on an indoor map, and to generate the global path planning according to a node specification principle that is defined based on social norms for the indoor space.

According to some example embodiments, it is possible to achieve human-friendly navigation of a robot in an indoor environment based on social norms as well as an efficient movement of the robot by defining a node and a travel path principle for global path planning of the robot.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
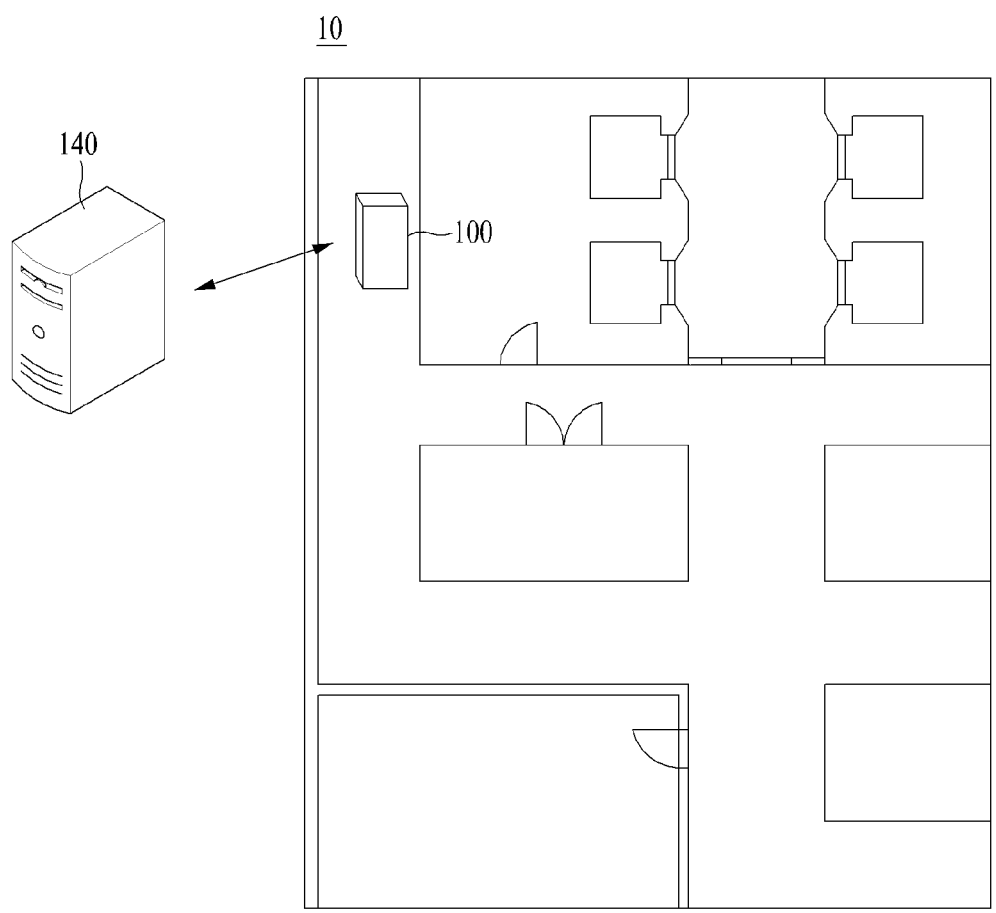
FIG. 1 illustrates an example of a robot movement environment in an indoor space according to an example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments may define an optimal node principle according to indoor environment requirements for robot movement based on an indoor map generated by a mapping robot and may define an edge principle that applies not only the shortest path but also an environmental factor affecting the efficient movement of a robot in the case of path planning.

FIG. 1 illustrates an example of a robot movement environment in an indoor space according to an example embodiment.

Referring to FIG. 1, a robot 100 may be a service robot used to provide a service in an indoor space 10 within a building. The robot 100 may be configured to provide a service on at least one floor within the building. Also, when a plurality of robots 100 is present, each of the plurality of robots 100 may be configured to provide a service on at least one floor. That is, the robot 100 may be configured to provide a service on one or more floors based on the type/providing frequency of the service and/or the form/structure of the building (floor). The plurality of robots 100 may be configured to provide services on a single floor.

The service provided from the robot 100 may include, for example, a delivery service, an order-based beverage (coffee, etc.) delivery service, a cleaning service, and other information/content providing services.

Movements of the robot 100 within the indoor space 10 may be performed through a robot control system 140. That is, the robot 100 may move in the indoor space 10 under the control of the robot control system 140.

Figure 2:
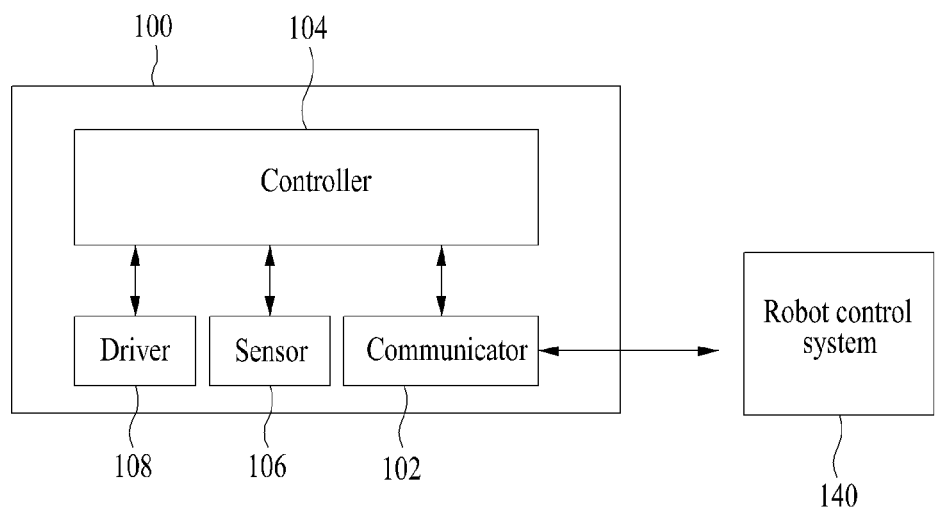
FIG. 2 illustrates a block diagram of a robot for providing a service in an indoor space within a building according to an example embodiment.

FIG. 2 illustrates an example of a robot for providing a service in an indoor space within a building according to an example embodiment.

As described above, the robot 100 may be a service robot that is used to provide a service in an indoor environment in which the robot 100 occupies with a person. The robot 100 may provide the service to a user at a predetermined (or, alternatively, desired) position of the indoor space 10 through autonomous driving.

Referring to FIG. 2, the robot 100 may be a physical device and may include a controller 104, a driver 108, a sensor 106, and a communicator 102.

Although not illustrated, the controller 104 may be a physical processor embedded in the robot 100 and may include a path planning processing module, a mapping processing module, a driving control module, a localization processing module, a data processing module, and a service processing module. Here, the path planning processing module, the mapping processing module, and the localization processing module may be selectively included in the controller 104 depending on example embodiments to enable indoor autonomous driving of the robot 100 regardless of a failure in communication with the robot control system 140.

The communicator 102 may be a configuration for the robot 100 to communicate with another device, for example, another robot or the robot control system 140. That is, the communicator 102 may be a hardware module, such as, for example, an antenna, a data bus, a network interface card, a network interface chip, and a networking interface port of the robot 100, and a software module, such as, for example, a network device driver and a networking program, configured to transmit/receive data and/or information to/from another device.

The driver 108 may include equipment or components configured for controlling and enabling movement of the robot 100.

The sensor 106 may be a component configured to collect required data for autonomous driving and service providing of the robot 100. The sensor 106 may not include expensive sensing equipment and may simply include, for example, a low-cost ultrasonic sensor and/or a low-cost camera.

For example, the data processing module of the controller 104 may transmit sensing data including output values of sub-sensors of the sensor 106 to the robot control system 140 through the communicator 102. The robot control system 140 may transmit path information generated using an indoor map of the building to the robot 100. The path data may be transmitted to the data processing module through the communicator 102. The data processing module may immediately transmit the path data to the driving control module and the driving control module may control the driver 108 based on the path data and may control indoor autonomous driving of the robot 100.

When the robot 100 is incommunicable with the robot control system 140, the data processing module may transmit sensing data to the localization processing module and may generate path data through the path planning processing module and the mapping processing module and may directly process indoor autonomous driving of the robot 100.

The robot 100 may be distinguished from a mapping robot used to generate the indoor map of the building. Here, since the robot 100 does not include high-cost sensing equipment, the robot 100 may process indoor autonomous driving using an output value of, for example, a low-cost ultrasonic sensor and/or a low-cost camera. If the robot 100 has processed indoor autonomous driving in communication with the robot control system 140, the robot 100 may use mapping data included in the existing path data received from the robot control system 140 and may enable further precise indoor autonomous driving using low-cost sensors.

The service processing module may receive an instruction received through the robot control system 140 through the communicator 102 or through the communicator 102 and the data processing module. The driver 108 may further include equipment for movement of the robot 100 and equipment related to the service provided from the robot 100. For example, to perform a food/delivery item delivery service, the driver 108 of the robot 100 may include a component configured to load food/delivery item or a component (e.g., a robot arm) configured to deliver food/delivery item to a user. Also, the robot 100 may further include a speaker and/or display configured to provide information/content. The service processing module may transfer driving instructions for a service to be provided to the driving control module. In response to the driving instructions, the driving control module may control a component included in the robot 100 or the driver 108 such that the service may be provided.

The robot 100 may process indoor autonomous driving of a global navigation that moves along waypoints based on social norms under the control of the robot control system 140. Depending on example embodiments, the robot 100 may generate path data through the path planning processing module and the mapping processing module.

Figure 3:
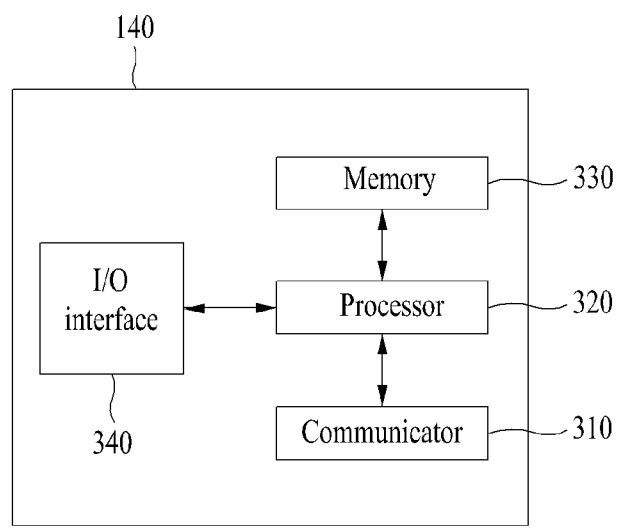
FIG. 3 illustrates a block diagram of a robot control system configured to control a robot providing a service in an indoor environment according to an example embodiment.

FIG. 3 illustrates an example of a robot control system configured to control a robot that provides a service in an indoor environment according to an example embodiment.

The robot control system 140 may be a device that controls the movements of the robot 100 in the indoor space 10. The robot control system 140 may control the movements of each of a plurality of robots 100 and providing of a service by each of the plurality of robots 100.

The robot control system 140 may include at least one computing device and may be configured as a server present inside or outside a building. The robot control system 140 may be configured as a cloud server (system).

Referring to FIG. 3, the robot control system 140 may include a memory 330, a processor 320, a communicator 310, and an I/O interface 340.

The memory 330 may include a permanent mass storage device, such as random access memory (RAM), read only memory (ROM), and a disk drive as a non-transitory computer-readable record medium. Here, the ROM and the permanent mass storage device may be separated from the memory 330 and may be included as a separate permanent storage device. Also, an operating system (OS) and at least one program code may be stored in the memory 330. Such software components may be loaded from a computer-readable storage medium separate from the memory 330. The separate computer-readable storage medium may include a non-transitory computer-readable record medium, such as a floppy drive, a disk, a tape, a DVD/CD-ROM drive, and a memory card. According to other example embodiments, software components may be loaded to the memory 330 through the communicator 310 instead of, or in addition to, the non-transitory computer-readable record medium.

The processor 320 may be configured to process computer-readable instructions of a computer program by performing basic arithmetic operations, logic operations, and I/O operations. The computer-readable instructions may be provided from the memory 330 or the communicator 310 to the processor 320. For example, the processor 320 may be configured to execute received instructions in response to the program code stored in the memory 330.

The communicator 310 may be a component to communicate with another device, for example, the robot 100. That is, the communicator 310 may be a hardware module, such as, for example, an antenna, a data bus, a network interface card, a network interface chip, and a networking interface port of the robot 100, and a software module, such as, for example, a network device driver and a networking program, configured to transmit/receive data and/or information to/from another device.

The I/O interface 340 may be a device for interface with an input device, such as, for example, a keyboard and a mouse, and an output device, such as a display and a speaker.

Also, according to other example embodiments, the robot control system 140 may include a number of components greater than or less than a number of components shown in FIG. 3.

Figures 4, 5:
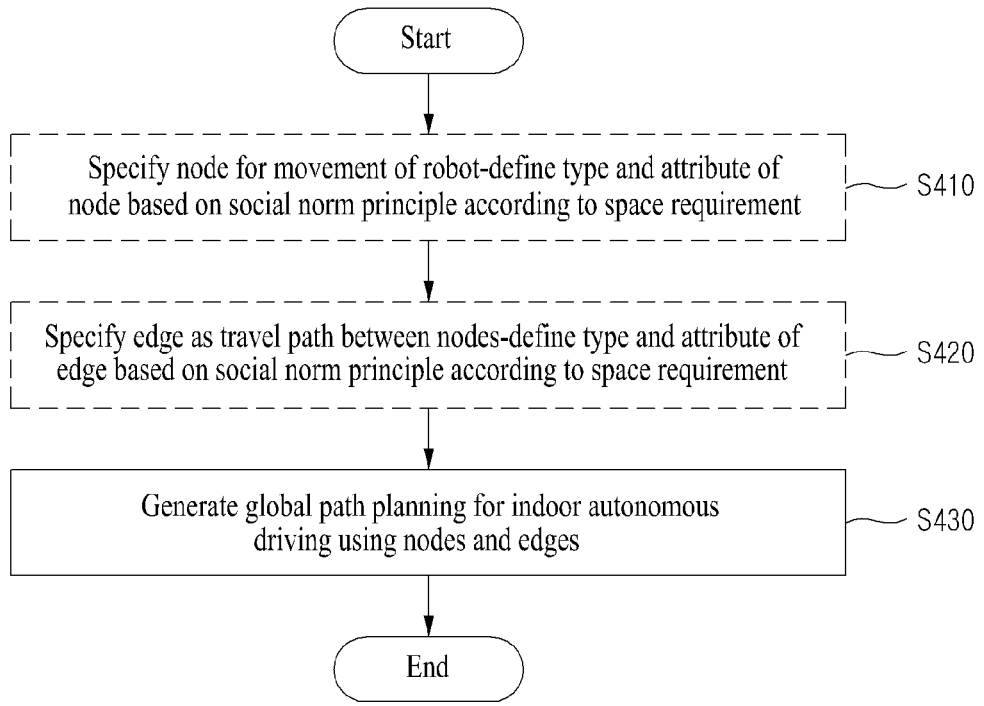
FIG. 4 is a flowchart of a method of generating path planning for autonomous driving of a robot according to an example embodiment.
FIG. 5 illustrates an example of a classification of an indoor space according to an example embodiment.

FIG. 4 is a flowchart illustrating an example of a method of generating path planning for autonomous driving of a robot according to an example embodiment.

The path planning generation method refers to a process of generating path data for indoor autonomous driving of the robot 100 and may be performed by the processor 320 of the robot control system 140. Depending on example embodiments, the robot 100 may generate path data through a path planning processing module and a mapping processing module and may directly process indoor autonomous driving of the robot 100.

Referring to FIG. 4, in operation 5410, the processor 320 may specify a node for controlling the movement of the robot 100 as a waypoint on an indoor map based on the indoor map generated by a mapping robot. Here, for the node, a plurality of types to which a social norm principle according to indoor space requirements is applied and an attribute for each type may be defined for global path planning of the robot 100. The node specification principle may be to assist efficient movement of the robot 100 and human-friendly navigation of the robot 100 in an indoor environment based on social norms.

In operation 5420, the processor 320 may specify an edge that connects nodes as a travel path of the robot 100. Similar to the node, for the edge, a plurality of types to which the social norm principle according to indoor space requirements is applied and an attribute for each type may be defined for the global path planning of the robot 100. In the case of path planning of the robot 100, an environmental factor that affects the efficient movement of the robot 100 and an edge specification principle that applies the same may be defined.

Types and attributes of a node and an edge are further described with reference to FIGS. 7 to 15.

In operation 5430, the processor 320 may generate the global path planning for indoor autonomous driving of the robot 100 using nodes and edges that apply the social norm principle according to the indoor space requirements. The processor 320 may generate path data for indoor autonomous driving of the robot 100 using nodes and edges that are defined based on social norms. Human-friendly navigation may be achieved in such a manner that the robot 100 simply moves along a global path generated using nodes and edges defined based on the social norm principle.

Basic principles for the human-friendly global navigation of the robot 100 may follow as:

(1) The robot 100 moves to a destination through an optimal path without disturbing movements of people and while receiving less interference from people based on social norms.

(2) The robot 100 moves safely by minimizing collisions in blind spots, such as, for example, a corner, a junction, and a front of a door.

(3) The robot 100 moves at a speed that does not threaten people according to a change in an environment, such as a narrow passage and a robot lane.

A social norm principle on the indoor space 10 may be defined into consideration of space requirements. The indoor space 10 in which the robot 100 moves may be classified based on its function or intended use as shown in FIG. 5. For example, the indoor space 10 may include a standard space 510, a connecting space 520, and a composite space 530.

The standard space 510 refers to an architecturally enclosed space, for example, a room such as a conference room.

The connecting space 520 refers to an element that is connected to another space and may include a door 521, a corridor 522, a junction 523, and a left-well 524. The door 521 may include, for example, a hinged door, a sliding door, an automatic door, and a doorless entrance, and may refer to a space that connects and passes two spaces in a boundary between the spaces. The corridor 522 connects spaces, such as a passage and is used to move to another spa, e.g., a hallway between rooms or between partitions in an office space. A robot lane, that is, a robot-only lane may be included as a portion of the corridor 522. The junction 523 refers to a space in which one corridor 522 and another corridor 522 meet and may include a space, such as a lobby that allows movements to a plurality of spaces. The left-well 524 refers to a vertically movable space and may include, for example, stairs, a ramp, an escalator, a slope, and an elevator.

The composite space 530 refers to a widely open space such as a central hall and may be divided by, for example, furniture to form a lower space, such as the standard space 510 and the connecting space 520.

Based on such space requirements, movement principles of the robot 100 may be defined. In particular, the movement principles of the robot 100 may be defined as follows based on the connecting space 520 that is a space in which the robot 100 mainly moves:

(1) Movement principle in the door 521
a) When passing in front of a door:
  Be careful that a person does not suddenly appear.
  Reduce the speed in a section in front of the door.
  In the case of a hinged door, pass by avoiding a trajectory section in which the door opens.
b) When passing through the door:
  Pass through the middle point of the doorway.
  When waiting in front of the door to pass through the door, wait while securing a sufficient space in front of the door to open and close the door.
c) In front of an elevator door:
  When waiting for an elevator, wait by the door of the corresponding elevator.
  When passing through the door of the elevator, pass through the middle point of the doorway.
d) Passing in front of stairs:
  Pass at a sufficient distance from the stairs to avoid falling down the stairs.

(2) Movement principle in the corridor 522
a) General passage (e.g., passage width of less than 3 m)
  Move based on right-hand traffic (RHT) considering social norms.
  Move while maintaining a certain distance from a right wall of the passage.
  Induce people to naturally pass by a side with a wider distance from the wall by allowing the robot 100 to move leaning closer toward one wall.
  When the passage width is less than or equal to a predetermined standard width, move along the center of the passage.
  When the passage width is less than or equal to a predetermined standard width, a corresponding passage is excluded from a travel path of the robot 100.
b) Wide passage (e.g., passage width of 3 m or more).
  Basically, move based on RHT. However, when the passage width is sufficiently wide, move while increasing the distance from the right wall or prioritize moving in a shortest path rather than RHT.

(3) Movement principle in the junction 523
a) When the robot 100 travelling on RHT enters another corridor in a corner or a junction section, the robot 100 enters in an RHT direction of the corridor to enter.
  When turning right at the corner, enter the corner by staying closely to the right wall.
  When turning left at the corner, enter the corner by staying closely to the right wall of the passage to be entered.
  When entering a passage on the other side in a junction section, enter the passage by staying closely to the right wall of the passage to enter.

b) When passing a corner or junction section, be careful not to interfere with the travel of a person who may appear in a blind spot.
  Reduce the speed before entering a junction section in a passage.

Figure 6:
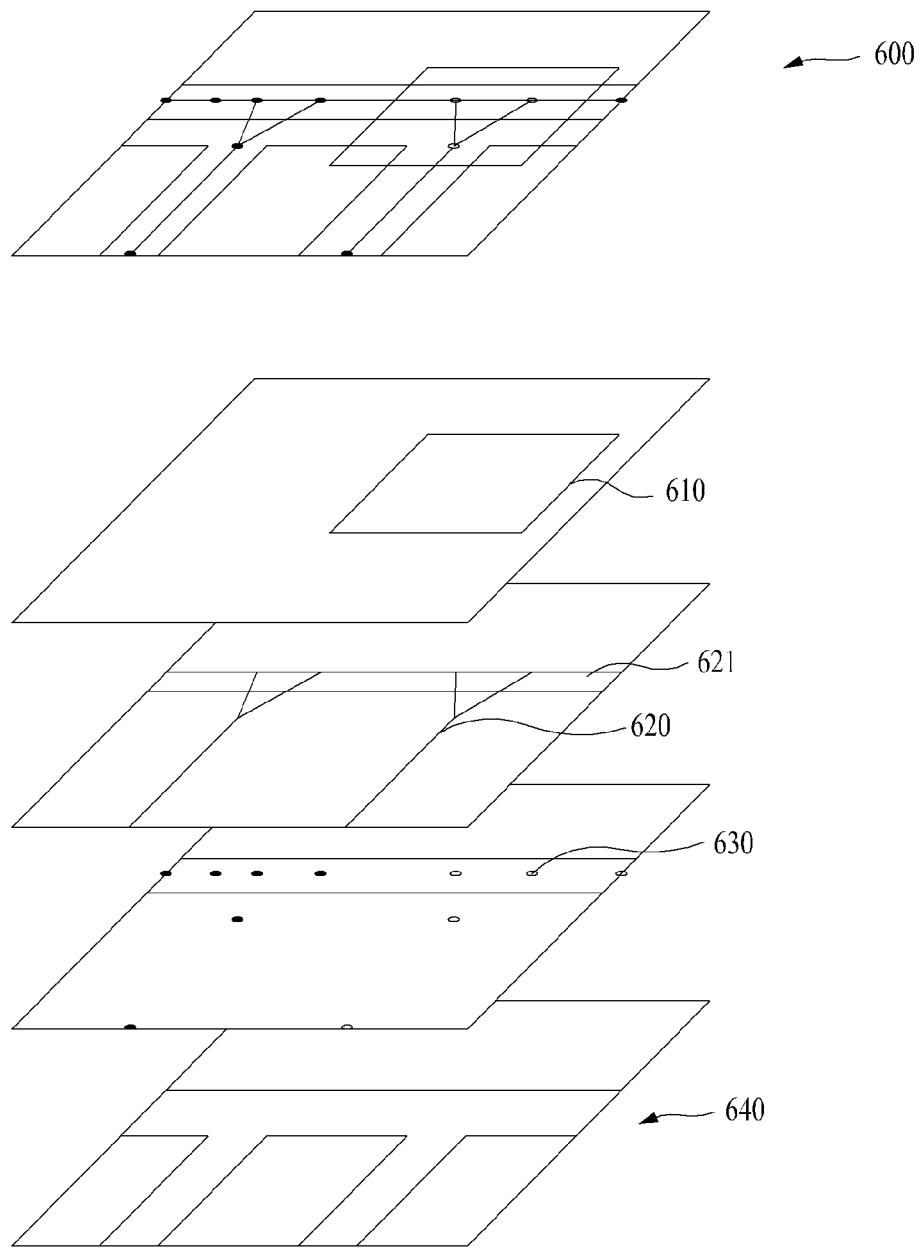
FIG. 6 illustrates an example of components of a map required to control a movement of a robot according to an example embodiment.

FIG. 6 illustrates an example of a component of a map required to control movements of a robot according to an example embodiment.

Referring to FIG. 6, an indoor map 600 may be generated by a mapping robot and may include a set of all information required to control the movements of the robot 100, such as a virtual wall 610, an edge 620, a node 630, a space layer 640, and the like.

The virtual wall 610 represents a polygon area for preventing the entry of the robot 100. The robot control system 140 may observe real-time coordinates of the robot 100 and may prevent the robot 100 from entering the polygon area.

The edge 620 may be a line that connects the nodes 630, and may include information associated with the movement attributes of the robot 100. The edge 620 may include a separate interface 621 for assigning an attribute.

The node 630 may be a data point that the robot 100 refers to for movements and may include metadata, such as the travel speed of the robot 100 and the travel direction of the robot 100. The robot 100 moves by going from node to node. In one embodiment, the robot control system 140 stores the indoor map, and generates a movement path of the robot 100 based on the stored indoor map and transmits it to the corresponding robot 100. An embodiment in which the robot 100 stores an indoor map for movement is also contemplated.

The space layer 640 may include a layer that is a skeleton of a building and a structure through which the robot 100 may not actually pass.

Hereinafter, a principle of specifying nodes and edges for global path planning of the robot 100 is described.

Figure 7:
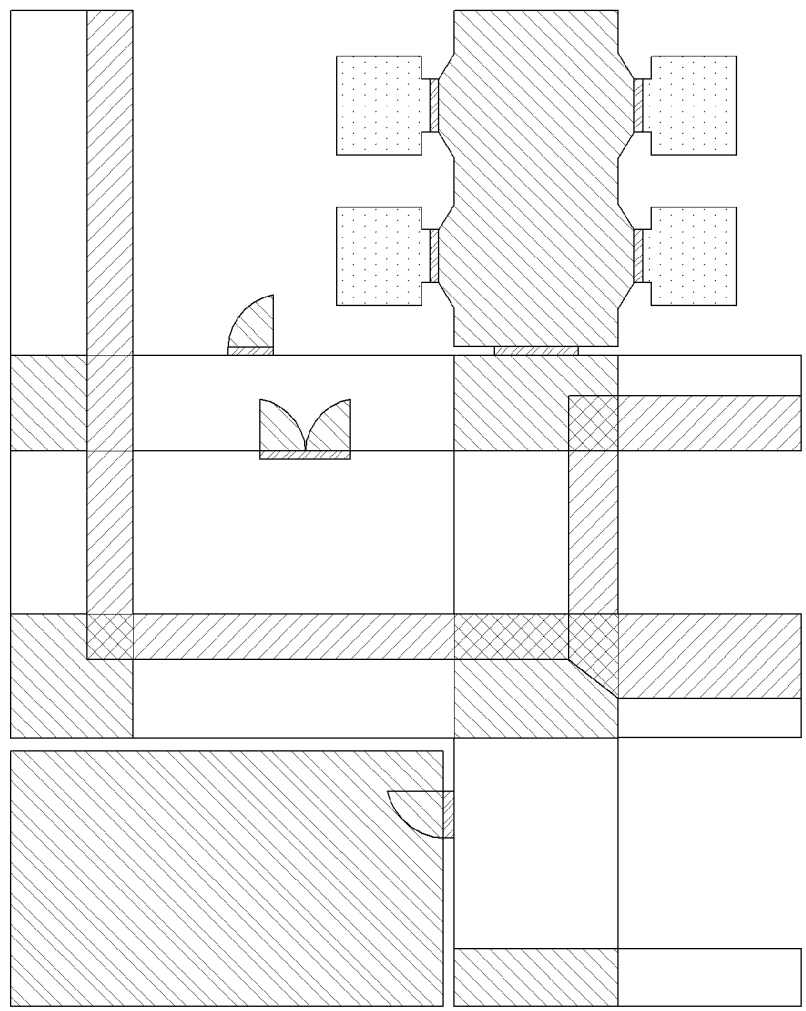
FIG. 7 illustrates an example of an indoor map representing a moving space of a robot according to an example embodiment.

FIG. 7 illustrates an example of an indoor map that represents a movement space of a robot according to an example embodiment.

FIG. 7 illustrates a space layer that represents the indoor space 10 in which the robot 100 moves. Referring to FIG. 7, the indoor space 10 may be classified into a door 701, a corridor 702, a junction 703, a robot lane 704, a left-well 705, a room 706, and the like, based on the space classification standard of FIG. 5.

FIGS. 8 to 12 illustrate examples of a node specifying process based on indoor space requirements according to an example embodiment. A node for movement of the robot 100 may be specified by applying a social norm principle according to indoor space requirements on a space layer of the indoor space 10.

As a reference point used by the robot 100 to move, a node type according to the indoor space requirements may be classified into a corridor entry node 801, a corridor end node 802, a door area start node 803, a door area end node 804, a door pass node 805, a door open prevention node 806, a robot lane node 807, a basic passing node 808, and a waiting node 809.

Figure 8:
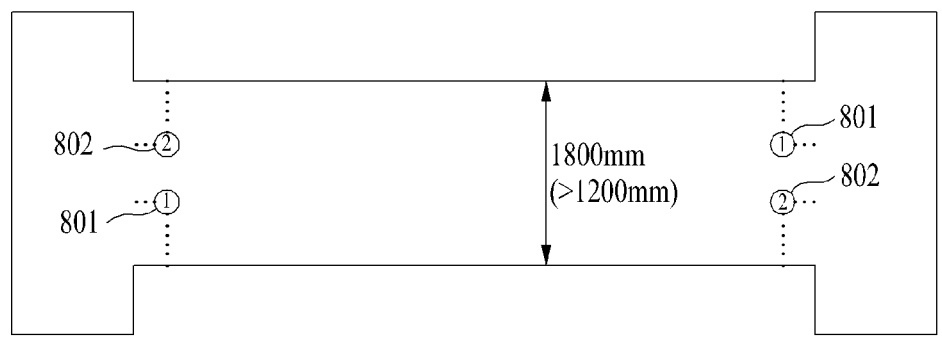
FIGS. 8 to 12 illustrate examples of a node specification process based on indoor space requirements according to an example embodiment.

Referring to FIG. 8, the corridor entry node 801 may represent a right corridor start point in a corridor, and the corridor end node 802 may represent a right corridor end point in the corridor. Each of the corridor entry node 801 and the corridor end node 802 may have attribute values that include the coordinates of a corresponding point and an RHT direction parallel to the wall. For example, if the corridor width is greater than 1.2 m, a point 600 mm separate, i.e., away, from the right wall and separate from 300 mm from a corridor entrance side may be specified as the corridor entry node 801 and a point 600 mm separate from the right wall and 300 mm separate from a corridor exit side may be specified as the corridor end node 802. If the corridor width is less than or equal to 1.2 m, the corridor entry node 801 and the corridor end node 802 may be specified at the center of the entire corridor width.

Figure 9:
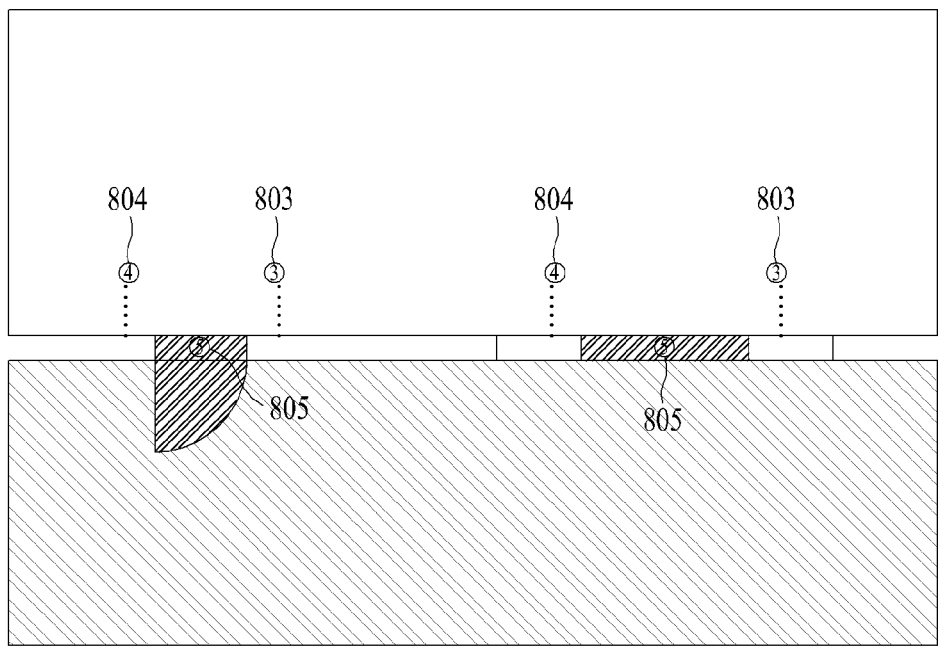

Referring to FIG. 9, the door area start node 803 may represent the start point of a caution section in front of a door, and the door area end node 804 may represent the end point of the caution section in front of the door. Each of the door area start node 803 and the door area end node 804 may have attribute values that include the coordinates of a corresponding point and an RHT direction parallel to a wall. For example, a point 600 mm separate from a right wall and 300 mm before the door may be specified as the door area start node 803, and a point 600 mm separate from the right door and 300 mm after the door may be specified as the door area end node 804.

Referring to FIG. 9, the door pass node 805 may represent the middle position of the entire width of the doorway as the point that the robot passes through the door and may include attribute values that include the coordinates of a corresponding point and both directions vertical to the door.

Figure 10:
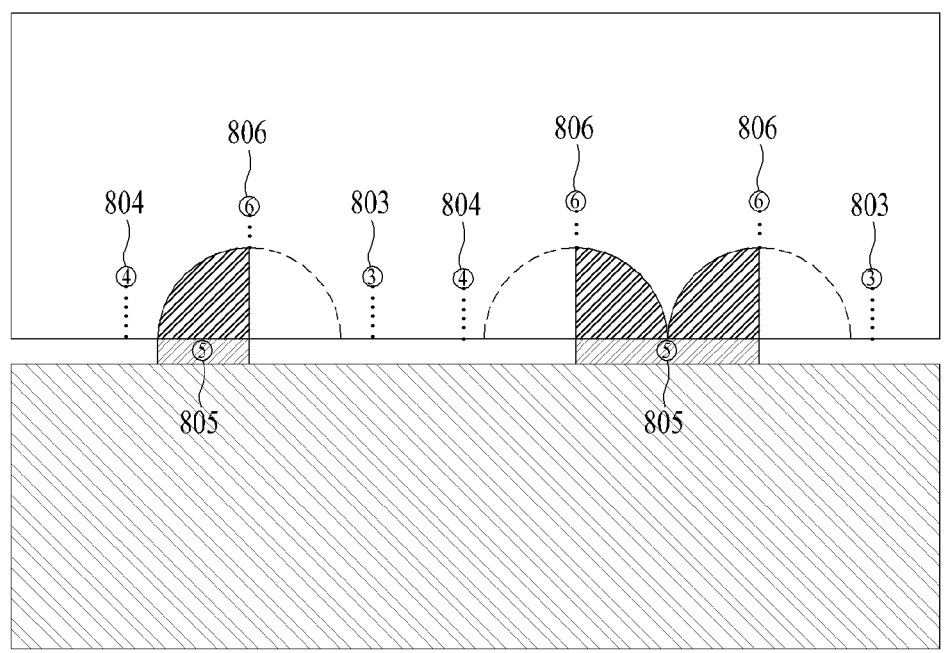

Referring to FIG. 10, the door open prevention node 806 is to avoid the a hinged door that opens in into a corridor and may have attribute values that include coordinates of a corresponding point and an RHT direction parallel to the wall. For example, when the door opens at 90 degrees, a point 300 mm on an extension line of the door may be specified as the door open prevention node 806. In the case of the hinged door that opens into the corridor, the door area start node 803 and the door area end node 804 may be specified based on a case in which the door is completely closed.

Figure 11:
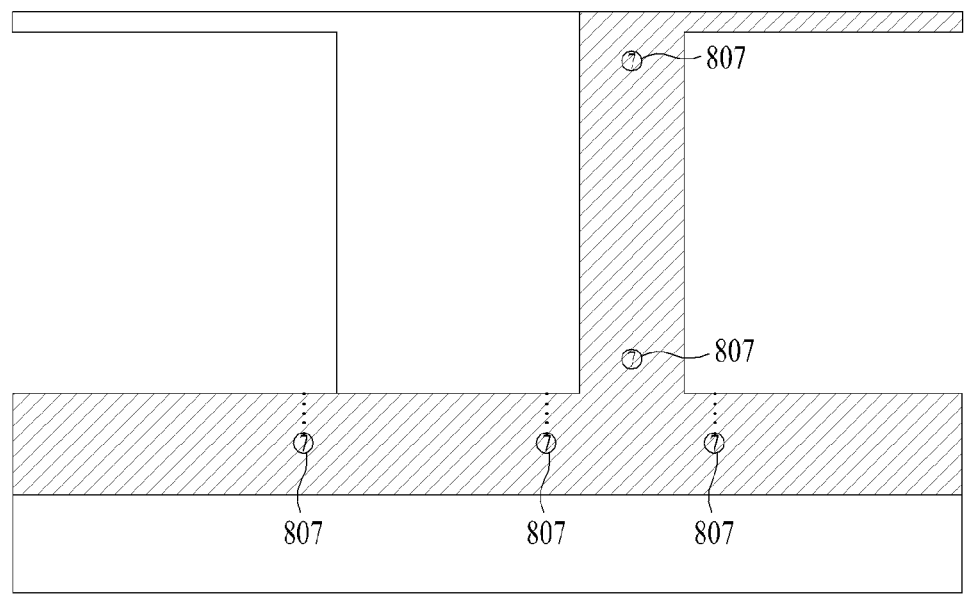

Referring to FIG. 11, the robot lane node 807 may refer to a node on a robot lane and may have attribute values that include coordinates of a corresponding point and both directions parallel to the wall. For example, a point 500 mm separate from the wall and 300 mm separate from a junction side may be specified as the robot lane node 807. In a robot lane, the robot 100 is allowed to move in both directions except for at least a partial section which may be a one-way section.

Figure 12:
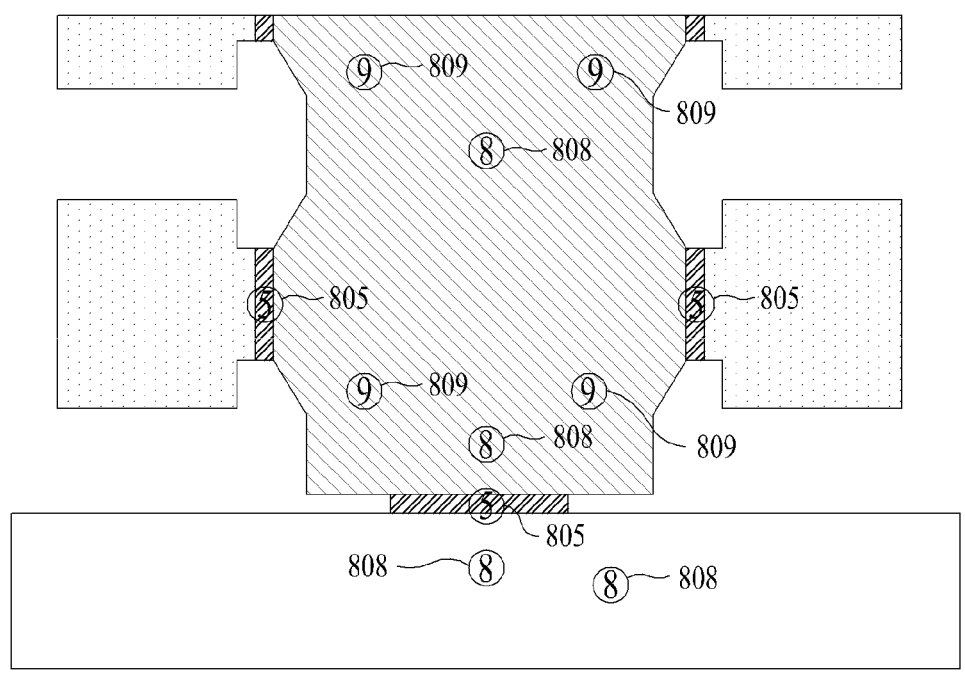

Referring to FIG. 12, a point that requires specifying a separate node for the purpose of a direction change may be specified as the basic passing node 808 and may have attribute values that include coordinates of a corresponding point and a travel direction. In the case of the basic passing node 808, a direction value may be omitted from the attribute values. For example, in the case of an elevator hall, people gather in front of an elevator door. Therefore, to avoid the elevator hall as much as possible, the basic passing node 808 may be specified on a basic travel path by using a center line of the hall as the basic travel path. To pass through the door, the basic passing node 808 may be specified before and after the door pass node 805.

Referring to FIG. 12, the waiting node 809 may be specified as a position at which the robot 100 waits for an elevator and may have attribute values that include the coordinates of the corresponding point and a door-oriented direction. The waiting node 809 may be specified at a position adjacent to the door area start node 803 close to the heading direction of the robot 100. Here, a direction value may be designated such that the heading of the robot 100 may face toward the door.

Figure 13:
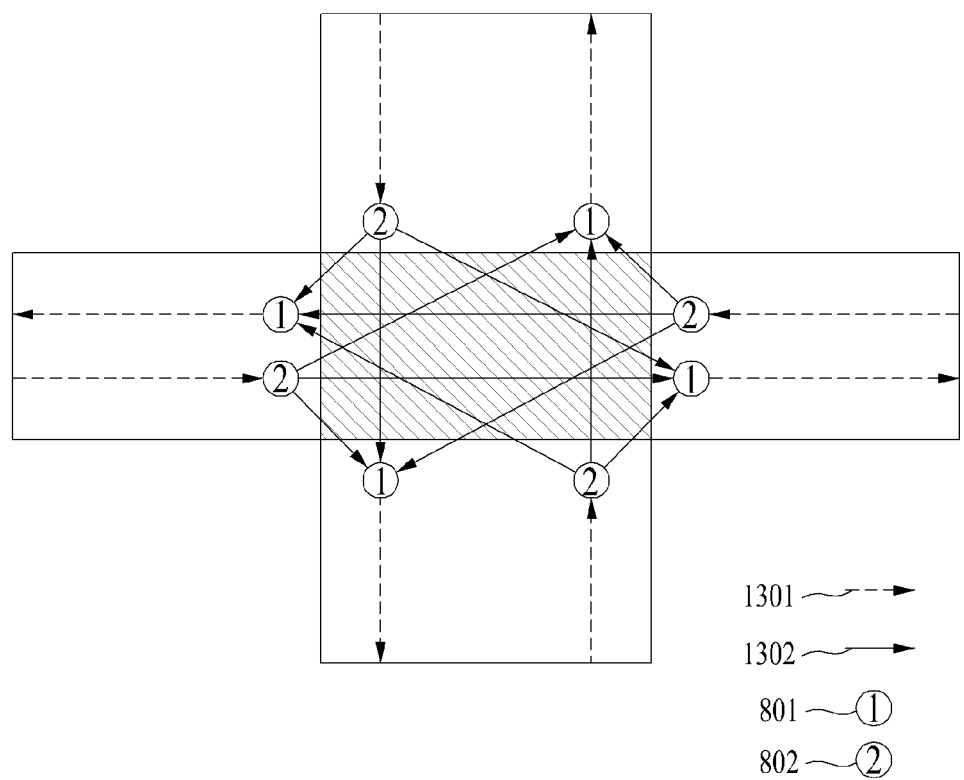
FIGS. 13 to 15 illustrate examples of an edge specification process based on indoor space requirements according to an example embodiment.
Figure 14:
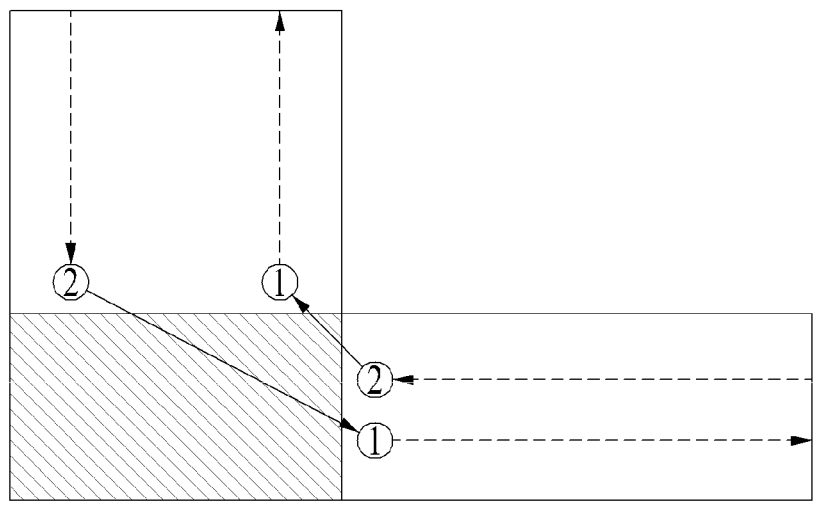
Figure 15:
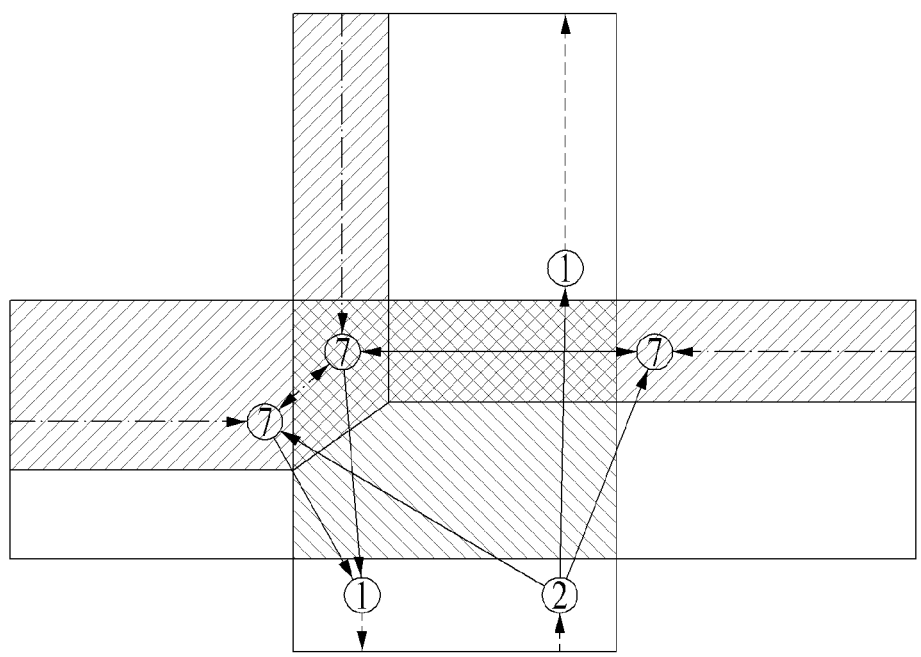

FIGS. 13 to 15 illustrate examples of an edge specification process based on indoor space requirements according to an example embodiment. An edge that connects nodes may be specified as a travel path of the robot 100 by applying a social norm principle according to indoor space requirements on a space layer of the indoor space 10.

An edge type may be classified into a basic edge 1301, a caution edge 1302, and a speedy edge 1303 based on the indoor space requirements. Each edge may have attribute values that include a robot heading direction and a speed limit.

Referring to FIGS. 13 and 14, the basic edge 1301 may represent a travel path that connects the corridor entry node 801 and the corridor end node 802 in the corridor. The basic edge 1301 is basically specified as one direction from the corridor entry node 801 to the corridor end node 802. In the case of a relatively narrow corridor, travel in both directions may be allowed. In the case of the basic edge 1301, the basic speed of the robot 100 may be set as a speed limit and, if the robot 100 encounters a person or an obstacle while moving, the robot 100 may avoid the person or the obstacle using local path planning.

Referring to FIGS. 13 and 14, any edge that overlaps a junction may be specified as the caution edge 1302 corresponding to a caution section where it may be necessary to reduce the speed of the robot 100. For example, a single node may have three caution edges 1302 in a crossroad, may have two caution edges 1302 in a three-way intersection, and may have a single caution edge 1302 in an L-shaped corner. Since an elevator hall also corresponds to the junction, all the edges in the hall may be specified as the caution edges 1302 and a caution section in front of a door and a section in which a robot lane and a junction meet may also be specified as the caution edges 1302. In the caution edge 1302, the robot 100 may be set to move at a reduced speed of 70% or less of the basic speed of the robot 100. The caution edge 1302 may be specified as a direction from the corridor entry node 801 to the corridor end node 802 at the junction and may be specified as a direction from the door area start node 803 to the door area end node 804 in front of the door. Although the caution edge 1302 is illustrated in a straight line in a corner section, the caution edge 1302 may an arc for collision prevention or natural driving.

Referring to FIG. 15, the speedy edge 1303 may represent a robot travel path that connects a robot lane. In the case of a robot lane, the robot 100 may move in both directions except for at least a partial section which may be a one-way section. In a corridor with the robot lane, a movement through a node or an edge of the wall on an opposite side may be avoided. In the speedy edge 1303, the robot 100 may be set to travel at a high speed of 160% or more of the basic speed of the robot 100.

The processor 320 may automatically specify nodes and edges for controlling the movements of the robot 100 based on the indoor space requirements on a three-dimensional (3D) map that is generated by a mapping robot.

Figure 16:
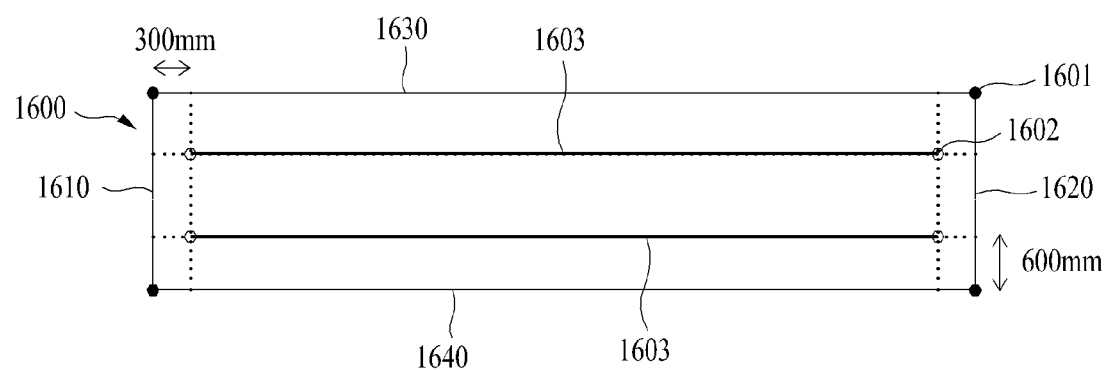
FIG. 16 illustrates an example of a node specification principle according to an example embodiment.

Referring to FIG. 16, in the case of a node specification principle in a corridor, a block may be generated by marking four vertices 1601 of a corridor 1600 and four vertices 1602 of sides offset by 300 mm from the entrance and the exit sides 1610 and 1620 and 600 mm from left and right wall sides 1630 and 1640 may be generated as nodes. Here, a side 1603 parallel to the wall may be generated as an edge, for example, the basic edge 1301. The direction of the edge may also be specified.

The processor 320 may add a node on a robot lane, which is similar to the node specification principle in the corridor.

The processor 320 may generate a block by marking four vertices based on the robot lane and then may generate a robot lane edge, that is, the speedy edge 1303 at the end of a side offset by 300 mm from the entrance and the exit sides and offset by 500 mm from a wall side.

A junction specification principle may specify a space in which corridors meet as a junction area and may connect nodes in contact with the junction area using an edge. The corridor end node 802 that is a start node in the junction section may be connected to all the corridor entry nodes 801 adjacent to the corridor end node 802. All edges across the junction area may be speed-limited as the caution edges 1302.

The processor 320 may add a node for a passing section in front of a door. For example, the processor 320 may add the door pass node 805 at a point 300 mm away from the left and the right sides of the doorway based on the door width to an RHT edge and may specify an edge therebetween as the caution edge 1302.

As described above, the processor 320 may specify nodes and edges for controlling the movements of the robot 100 based on an offset value preset according to social norms for each of indoor spaces classified based on characteristics on a 3D map. The processor 320 may specify a node according to indoor space requirements using a batch setting scheme or a sequential setting scheme. For example, the processor 320 may generate all the vertices of an offset side as a node at a time with respect to an indoor space on a map. As another example, when transferring an instruction to move the robot 100, the processor 320 may determine a reference point based on a travel direction of the robot 100 and may sequentially generate a point offset by a preset offset value from the reference point as a node based on the reference point.

As described above, according to some example embodiments, it is possible to achieve human-friendly navigation of a robot in an indoor environment based on social norms as well as an efficient movement of the robot by defining a node and a travel path (edge) principle for global path planning of the robot.

The systems and/or apparatuses described herein may be implemented using hardware components, software components, and/or a combination thereof. For example, a hardware component such as a processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

Software for enabling executing of the methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by Appstore that distributes applications or a site, a server, and the like that supplies and distributes other various types of software. Examples of program instructions include both machine code, such as produced by a compiler, and files containing higher level code that may be executed by the computer using an interpreter.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A path planning method of a robot performed by a computer system including at least one processor configured to execute computer-readable instructions recorded in a memory, the path planning method comprising:

Generating global path planning of a robot for an indoor space based on an indoor map, Wherein the global path planning is generated according to a node specification principle that generates at least one node for the indoor space, wherein the at least one node includes at least one attribute associated with movement of the robot on a path in the indoor space, the at least one attribute including a position coordinate, a travel direction and a travel speed of the robot and the movement of the robot being controlled based on the at least one attribute included in the at least one node, and Wherein the node specification principle comprises an edge specification principle for specifying an edge that connects nodes as a travel path of the robot, the edge specification principle including a specification principle for a basic edge in which the robot travels at a basic speed, a caution edge at a junction where at least two corridors intersect in which the robot travels at a reduced speed of a preset percentage of the basic speed or less, and a speedy edge in which the robot travels at a high speed of a preset percentage of the basic speed or more, Wherein the edge includes the at least one attribute and an edge type indicating at least one of the basic edge, the caution edge, and the speedy edge, and Wherein the edge including the edge type of the basic edge is specified based on the edge specification principle to connect an entry node and an end node and to allow for the robot to travel in a direction from the entry node to the end node or in both directions between the entry node and the end node based on a width of a corridor where the edge is specified.

2. The path planning method of claim 1, wherein the global path planning is generated using a plurality of nodes and edges that are specified based on a right-hand traffic (RHT)-based principle.

3. The path planning method of claim 2, wherein the at least one attribute includes a position coordinate and a travel direction defined for each of the nodes, and an attribute including a travel speed is defined for each of the edges.

4. The path planning method of claim 1, wherein the node specification principle comprises a specification principle for a corridor entry node that represents a right corridor start point in a corridor and a corridor end node that represents a right corridor end point in the corridor.

5. The path planning method of claim 4, wherein the node specification principle further comprises a specification principle for at least one of a door area start node that represents a start point of a caution section in front of a door, a door area end node that represents an end point of the caution section in front of the door, a door pass node that represents a point passing the door, a door open prevention node that represents a point for avoiding the door when opened, a robot lane node that represents a point on a robot lane, a basic passing node that represents a point requiring specification of a separate node, and a waiting node that represents a waiting position.

6. The path planning method of claim 1, wherein the edge specification principle is configured to specify a caution edge in which the robot travels at a reduced speed of a preset percentage of a basic speed of the robot or less when moving through at least one of a junction, a front of the door, and a front of an elevator, and to specify a speedy edge in which the robot travels at a high speed of the preset percentage of the basic speed or more when in a robot lane.

7. The path planning method of claim 1, wherein the generating comprises generating all of a plurality of vertices of an offset side based on an offset value preset for the indoor space, as nodes for movement of the robot.

8. The path planning method of claim 1, wherein the generating comprises determining a reference point based on a travel direction of the robot and generating, as a node for movement of the robot, a point offset by a preset offset value from the reference point.

9. A non-transitory computer-readable recording medium storing instructions that, when executed by a processor, cause the processor to perform the path planning method of claim 1.

10. The path planning method of claim 1, wherein the reduced speed is set at 70% or less of the basic speed and the high speed is set at 160% or more of the basic speed.

11. A computer system comprising:

At least one processor configured to execute computer-readable instructions recorded in a memory, Wherein the at least one processor is configured to generate global path planning of a robot for an indoor space based on an indoor map, Wherein the global path planning is generated according to a node specification principle that generates at least one node for the indoor space, wherein the at least one node includes at least one attribute associated with movement of the robot on a path in the indoor space, the at least one attribute including a position coordinate, a travel direction and a travel speed of the robot, and the movement of the robot being controlled based on the at least one attribute included in the at least one node, and Wherein the node specification principle comprises an edge specification principle for specifying an edge that connects nodes as a travel path of the robot, the edge specification principle including a specification principle for a basic edge in which the robot travels at a basic speed, a caution edge at a junction where at least two corridors intersect in which the robot travels at a reduced speed of a preset percentage of the basic speed or less, and a speedy edge in which the robot travels at a high speed of a preset percentage of the basic speed or more, Wherein the edge includes the at least one attribute and an edge type indicating at least one of the basic edge, the caution edge, and the speedy edge, and Wherein the edge including the edge type of the basic edge is specified based on the edge specification principle to connect an entry node and an end node and to allow for the robot to travel in a direction from the entry node to the end node or in both directions between the entry node and the end node based on a width of a corridor where the edge is specified.

12. The computer system of claim 11, wherein the at least one processor is configured to generate the global path planning using a plurality of nodes and edges that are specified based on a right-hand traffic (RHT)-based principle, wherein the at least one attribute is associated with each of the nodes, and wherein the at least one attribute includes a travel speed defined for each of the edges.

13. The computer system of claim 11, wherein the node specification principle comprises a specification principle for a corridor entry node that represents a right corridor start point in a corridor and a corridor end node that represents a right corridor end point in the corridor.

14. The computer system of claim 13, wherein the node specification principle further comprises a specification principle for at least one of a door area start node that represents a start point of a caution section in front of a door, a door area end node that represents an end point of the caution section in front of the door, a door pass node that represents a point passing the door, a door open prevention node that represents a point for avoiding the door when opened, a robot lane node that represents a point on a robot lane, a basic passing node that represents a point requiring specification of a separate node, and a waiting node that represents a waiting position.

15. The computer system of claim 13, wherein the edge specification principle is configured to specify a caution edge in which the robot travels at a reduced speed of a preset percentage of a basic speed of the robot or less when moving through at least one of a junction, a front of the door, and a front of an elevator, and to specify a speedy edge in which the robot travels at a high speed of the preset percentage of the basic speed or more when in a robot lane.

16. The computer system of claim 11, wherein the at least one processor is configured to generate all of a plurality of vertices of an offset side based on an offset value preset for the indoor space, as nodes for movement of the robot.

17. The computer system of claim 11, wherein the at least one processor is configured to determine a reference point based on a travel direction of the robot and generate, as a node for movement of the robot, a point offset by a preset offset value from the reference point.

18. The computer system of claim 11, wherein the reduced speed is set at 70% or less of the basic speed and the high speed is set at 160% or more of the basic speed.

* * * * *